(12) United States Patent
Suzuki et al.

(10) Patent No.: US 8,003,556 B2
(45) Date of Patent: Aug. 23, 2011

(54) OPTICAL GLASS

(75) Inventors: Junko Suzuki, Sagamihara (JP);
Michiko Ogino, Sagamihara (JP);
Masahiro Onozawa, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 256 days.

(21) Appl. No.: 12/100,798

(22) Filed: Apr. 10, 2008

(65) Prior Publication Data

US 2009/0088310 A1   Apr. 2, 2009

Related U.S. Application Data

(60) Provisional application No. 60/976,193, filed on Sep. 28, 2007.

(51) Int. Cl.
*C03C 3/068* (2006.01)
*C03C 3/062* (2006.01)
*C03C 3/064* (2006.01)
*C03C 3/066* (2006.01)

(52) U.S. Cl. ............... 501/78; 501/73; 501/77; 501/79

(58) Field of Classification Search .......... 501/73, 501/77, 78, 79
See application file for complete search history.

(56) References Cited

U.S. PATENT DOCUMENTS

| | | | |
|---|---|---|---|
| 4,111,707 A * | 9/1978 | Komorita et al. ............. 501/78 |
| 4,226,627 A * | 10/1980 | Inoue et al. ............. 501/50 |
| 6,394,606 B1 | 5/2002 | Miyawaki et al. | |
| 7,138,349 B2 * | 11/2006 | Uehara et al. ............. 501/78 |
| 7,659,222 B2 | 2/2010 | Shimizu | |
| 2003/0032542 A1 * | 2/2003 | Endo ............. 501/50 |
| 2003/0050177 A1 * | 3/2003 | Uehara ............. 501/78 |
| 2004/0220041 A1 * | 11/2004 | Isowaki et al. ............. 501/78 |
| 2008/0220961 A1 | 9/2008 | Uehara et al. | |
| 2009/0149307 A1 | 6/2009 | Shimizu | |

FOREIGN PATENT DOCUMENTS

| | | |
|---|---|---|
| CN | 1253456 A | 5/2000 |
| CN | 1704369 A | 12/2005 |

OTHER PUBLICATIONS

Chinese Office Action dated Dec. 31, 2010, issued in corresponding Chinese Patent Application 200710151795.6.

* cited by examiner

*Primary Examiner* — Jerry Lorengo
*Assistant Examiner* — Noah S Wiese
(74) *Attorney, Agent, or Firm* — Westerman, Hattori, Daniels & Adrian, LLP

(57) ABSTRACT

There is provided an optical glass with a high refractive index and a low dispersion having a refractive index (nd) of not less than 1.75 and an Abbe's number (vd) of not less than 35 where the image formation characteristic is hardly affected by changes in temperature of the using environment. $SiO_2$, $B_2O_3$ and $La_2O_3$ are contained as essential components and the ratio of the constituting components are adjusted whereby an optical glass in which a product of α and β where α is an average linear expansion coefficient at −30 to +70° C. and β is an optical elasticity constant at the wavelength of 546.1 nm is not more than $130 \times 10^{-12}$ °$C.^{-1} \times nm \times cm^{-1} \times Pa^{-1}$ is able to be achieved.

18 Claims, No Drawings

OPTICAL GLASS

BACKGROUND OF THE INVENTION

1. Field of the Invention

The present invention relates to an optical glass having a high refractive index and a low dispersion where the refractive index (nd) is not less than 1.75 and an Abbe's number (vd) is not less than 35 and also relates to an optical element such as lens and prism prepared by utilizing this optical glass. More particularly, it relates to an optical glass having a high refractive index and a low dispersion which is suitable as prism and projection lens of optical instruments represented by projector and camera where a highly precise image formation characteristic and also relates to an optical element and an optical instrument prepared therefrom.

2. Description of the Related Art

There is a very high demand for glass having a high refractive index and a low dispersion as a material for optical elements such as various kinds of lenses and, with regard to an optical glass where a refractive index (nd) is not less than 1.75 and an Abbe's number (vd) is not less than 35, various kinds of glass compositions represented by Patent Documents 1 to 3 have been known.

In recent years, there has been a progress in digitization of optical instruments and making them precise and there has been a demand of high properties for optical elements used for the instruments for the reproduction (projection) such as a projector and a projection TV as well as for instruments for taking pictures such as digital camera and video camera. The properties are now not only covering the characteristic such as refractive index, Abbe's number and degree of coloration which have been demanded for optical glass already but also covering little variation in the characteristic under an actually using environment and little environmental load during the manufacture of optical glass and the processing of optical elements.

With regard to a change in image forming characteristic under an actually using environment, it has been presumed to be as follows that an optical element such as lens and prism is fixed by a jig in optical instruments and, when temperature of the using environment changes (such as a change in temperature in the box or use under high temperature), thermal expansion of the optical element is resulted and, due to the difference in its expansion coefficient from that of the fixing jig, stress is resulted in the optical element whereby double refraction is resulted in the optical element and image forming characteristic changes.

As mentioned above, when the image formation characteristic designed by optical constants such as a refractive index and an Abbe's number obtained under predetermined temperature (mostly around room temperature) is not achieved in the actual using environment, there is a disadvantage that, upon the optical designing, the using environment is to be predicted and the design is to be conducted presuming the complicated variations in the characteristic.

When there are components having a high environmental load such as a lead (Pb) compound or an arsenic (As) compound at the time of manufacturing the optical glass and processing of optical elements, there is a disadvantage that special measures are necessary for the prevention of diffusion of polluting substances into air and water. Further, when a rare mineral resource represented by tantalum (Ta) is used in large amounts, not only the production cost becomes high but also cost and labor for recovery of the source are necessary.

With regard to an optical glass with a high refractive index and a low dispersion containing no components having high environmental load in the glass composition, various glass compositions represented by the patent gazettes 1 to 3 are disclosed but no consideration has been done for changes in image formation characteristic under an actually using environment.

Patent Document 1: JP-A-2005-306732
Patent Document 2: JP-A-2002-284542
Patent Document 3: JP-A-2004-161506
Patent Document 4: JP-A-56-160340
Patent Document 5: JP-A-52-14607

Under such circumstances, the an object of the invention is to provide an optical glass having a high refractive index and a low dispersion where the refractive index (nd) is not less than 1.75 and the Abbe's number (vd) is not less than 35 which is hardly affected by image formation characteristic by changes in temperature of the using environment without the use of large amounts of the components having high environmental load and the rare mineral resources.

SUMMARY OF THE INVENTION

In order to achieve the above object, the present inventors have repeatedly carried out intensive tests and studies and, as a result, they have found that, when $SiO_2$, $B_2O_3$ and $La_2O_3$ are made to contain as essential components and ratio of the constituting components is adjusted, an optical glass having a high refractive index and a low dispersion by which the product of $\alpha$ and $\beta$ (where $\alpha$ is an average linear expansion coefficient within $-30°$ C. to $+70°$ C. and $\beta$ is an optical elasticity constant at the wavelength of 546.1 nm) is able to be made not more than $130 \times 10^{-12 \circ}$ C.$^{-1} \times$nm$\times$cm$^{-1}$ mp Pa$^{-1}$ is now able to be prepared without the use of large amounts of components having a high environmental load and rare mineral resources whereby the above object is achieved and they have accomplished the invention. The constitution will be shown as follows.

DETAILED DESCRIPTION OF PREFERRED EMBODIMENTS (Constitution 1)

An optical glass which is characterized in that the product of $\alpha$ and $\beta$ where $\alpha$ is an average linear expansion coefficient within $-30°$ C. to $+70°$ C. and $\beta$ is an optical elasticity constant at the wavelength of 546.1 nm is not more than $130 \times 10^{-12 \circ}$ C.$^{-1} \times$nm$\times$cm$^{-1} \times$Pa$^{-1}$, $SiO_2$ is contained therein in an amount of more than 1.0% by mass and less than 12.0% by mass on the basis of an oxide, $B_2O_3$ is contained in an amount of 8.0 to 35.0% by mass, the ratio of $SiO_2/B_2O_3$ in terms of % by mass is more than 0 and less than 0.6 and $La_2O_3$ is contained in an amount of 25.0 to 50.0% by mass.

(Constitution 2)

The optical glass according to the constitution 1, wherein the glass has optical constants within the rages where the refractive index (nd) is 1.75 to 2.00 and the Abbe's number (vd) is 35 to 55.

(Constitution 3)

The optical glass according to the constitution 1 or 2, wherein the glass contains, on the basis of an oxide, 0.0 to 40.0% by mass of $Gd_2O_3$, 0.0 to 15.0% by mass of $Y_2O_3$, 0.0 to 15.0% by mass of $ZrO_2$, 0.0 to 25.0% by mass of $Ta_2O_5$, 0.0 to 18.0% by mass of $Nb_2O_5$ and 0.0 to 10.0% by mass of $WO_3$.

(Constitution 4)

The optical glass according to any of the constitutions 1 to 3, wherein the glass contains, on the basis of an oxide,
0.0 to 0.1% by mass of $GeO_2$ and/or
0.0 to 1.0% by mass of $Yb_2O_3$ and/or 0.0 to 1.0% by mass of $Ga_2O_3$ and/or
0.0 to 1.0% by mass of $Bi_2O_3$
and does not contain a lead compound such as PbO and an arsenic compound such as $As_2O_3$.

(Constitution 5)

The optical glass according to any of the constitutions 1 to 4, wherein the product of $\alpha$ and $\beta$ where $\alpha$ is an average linear expansion coefficient within $-30°$ C. to $+70°$ C. and $\beta$ is an optical elasticity constant at the wavelength of 546.1 nm is not more than $100 \times 10^{-12}$ °C.$^{-1} \times$nm$\times$cm$^{-1} \times$Pa$^{-1}$.

(Constitution 6)

The optical glass according to any of the constitutions 1 to 5, wherein the product of $\alpha$ and $\beta$ where $\alpha$ is an average linear expansion coefficient within $-30°$ C. to $+70°$ C. and $\beta$ is an optical elasticity constant at the wavelength of 546.1 nm is not more than $90 \times 10^{-12}$ °C.$^{-1} \times$nm$\times$cm$^{-1} \times$Pa$^{-1}$.

(Constitution 7)

The optical glass according to any of the constitutions 1 to 6, wherein the ratio of $(Ta_2O_5+Nb_2O_5+WO_3)/(Gd_2O_3+Y_2O_3)$ in terms of % by mass based on the oxides is more than 0.05 and less than 1.30.

(Constitution 8)

The optical glass according to any of the constitutions 1 to 7 wherein the glass contains
0 to 5.0% of $Li_2O$ and/or
0 to 5.0% of $Na_2O$ and/or
0 to 5.0% of $K_2O$ and/or
0 to 5.0% of $Cs_2O$ and/or
0 to 5.0% of MgO and/or
0 to 5.0% of CaO and/or
0 to 5.0% of SrO and/or
0 to 5.0% of BaO and/or
0 to 3.0% of $TiO_2$ and/or
0 to 3.0% of $SnO_2$ and/or
0 to 3.0% of $Al_2O_3$ and/or
0 to 5.0% of $P_2O_5$ and/or
0 to 10.0% of ZnO and/or
0 to 5.0% of $Lu_2O_3$ and/or
0 to 3.0% of $TeO_2$ and/or
0 to 2.0% of $Sb_2O_3$ and/or
0 to 3.0% of F
in terms of % by mass on the basis of an oxide.

(Constitution 9)

The optical glass according to any of the constitutions 1 to 8, wherein the glass contains less than 2.0% by mass of ZnO on the basis of an oxide.

(Constitution 10)

The optical glass according to any of the constitutions 1 to 9, wherein the glass contains less than 3.5% by mass of $Y_2O_3$ on the basis of an oxide.

(Constitution 11)

The optical glass according to any of the constitutions 1 to 10, wherein the ratio of $(ZrO_2+Ta_2O_5+Nb_2O_5)/(SiO_2+B_2O_3)$ in terms of % by mass on the basis of an oxide is less than 1.00.

(Constitution 12)

The optical glass according to any of the constitutions 1 to 11, wherein the glass contains less than 3.5% by mass of $Y_2O_3$ on the basis of an oxide, the ratio of $(ZnO+Y_2O_3)/La_2O_3$ in terms of % by mass on the basis of an oxide is more than 0 and less than 0.5 and the sum of $ZrO_2+Nb_2O_5$ in terms of % by mass is more than 5.0% and less than 13.0%.

(Constitution 13)

An optical glass, characterized in that, the glass contains more than 1.0% by mass and less than 10.0% by mass of $SiO_2$,
15.0 to 28.0% by mass of $B_2O_3$,
28.0 to 35.0% by mass of $La_2O_3$,
25.0 to 35.0% by mass of $Gd_2O_3$,
5.0 to 9.0% by mass of $ZrO_2$ and
0.1 to less than 2.0% by mass of ZnO and
0.0 to 6.0% by mass of $Ta_2O_5$ and/or
0.0 to 5.0% by mass of $Nb_2O_5$ and/or
0.0 to 1.0% by mass of $Sb_2O_3$ and/or
0.0 to less than 1.0% by mass of $Al_2O_3$
on the basis of an oxide where the sum of $ZrO_2+Nb_2O_5$ is more than 5.0% by mass to less than 13.0% by mass, the glass has optical constants within such ranges that the refractive index (nd) is 1.78 to 1.83 and the Abbe's number (vd) is 44 to 48 and the product of $\alpha$ and $\beta$ where $\alpha$ is an average linear expansion coefficient within $-30°$ C. to $+70°$ C. and P is an optical elasticity constant at the wavelength of 546.1 nm is not more than $90 \times 10^{-12}$ °C.$^{-1} \times$nm$\times$cm$^{-1} \times$Pa$^{-1}$.

(Constitution 14)

An optical element such as lens and prism where the glass mentioned in the constitutions 1 to 13 is a mother material.

(Constitution 15)

An optical element such as lens and prism which is prepared by a reheat press processing of the glass mentioned in the constitutions 1 to 14.

(Constitution 16)

An optical instrument such as camera and projector using the optical element and the optical substrate material prepared by the glass mentioned in claims 1 to 15.

As a result of adoption of the above-mentioned embodiments, it is now possible to provide an optical glass having a high refractive index and a low dispersion which is hardly affected by image formation characteristic caused by changes in temperature under the using environment and has a refractive index (nd) of not less than 1.75 and an Abbe's number (vd) of not less than 35.

The optical glass of the invention will be illustrated as follows.

The optical glass according to the above constitution 1 is characterized in that the product of $\alpha$ and $\beta$ where $\alpha$ is an average linear expansion coefficient within $-30°$ C. to $+70°$ C. and $\beta$ is an optical elasticity constant at the wavelength of 546.1 nm is not more than $130 \times 10^{-12}$ °C.$^{-1} \times$nm$\times$cm$^{-1} \times$Pa$^{-1}$1 and the index of $\alpha \times \beta$ shows changed amount of image formation characteristic under the using environment. To be more specific, it means that the more the average linear expansion coefficient $\alpha$, the more the expansion rate (changes in volume) of an optical element against the changes in temperature under the using environment and, therefore, it means that a big thermal stress is generated in an optical element fixed by a jig or the like. It also means that the more the optical elasticity constant $\beta$, the more the double refraction generated by the resulted thermal stress and, in other words, it suggests that the less the $\alpha \times \beta$, the less the changes in the image formation characteristic under the using environment.

Incidentally, there is an advantage that, when the product of $\alpha$ and $\beta$ is not more than $130 \times 10^{-12}$ °C.$^{-1} \times$nm$\times$cm$^{-1} \times$Pa$^{-1}$, an image formation characteristic desired upon an optical design is apt to be achieved even when the temperature changes under an actually using environment.

In order to achieve that the product of $\alpha$ and $\beta$ is not more than $130 \times 10^{-12}$ °C.$^{-1} \times$nm$\times$cm$^{-1} \times$Pa$^{-1}$1 in the optical glass having a high refractive index and a low dispersion, the constitution 1 is characterized in that $SiO_2$ is contained therein in an amount of more than 1.0% by mass and less than 12.0% by mass on the basis of an oxide, $B_2O_3$ is contained in an amount of 8.0 to 35.0% by mass, the ratio of $SiO_2/B_2O_3$ in terms of % by mass is more than 0 and less than 0.6 and $La_2O_3$ is contained in an amount of 25.0 to 50.0% by mass.

Now each of the components will be illustrated. An $SiO_2$ component promotes stable formation of glass and has an effect of suppressing the devitrification (production of crystalline products) and cord (non-uniformity inside the glass) which are unfavorable for optical glass. However, when it is contained too much, a refractive index (nd) is apt to become small and an optical elasticity constant β is apt to significantly increase and, as a result, a desired characteristic is hardly achieved. Therefore, its upper limit is less than 12.0% by mass, more preferably 11.5% by mass and, most preferably 11.0% by mass and the amount is preferably more than 1.0% by mass, more preferably not less than 1.2% by mass and, most preferably, not less than 1.4% by mass. Although the $SiO_2$ component is able to be contained in any material form, it is preferred to be introduced in a form of an oxide ($SiO_2$), $K_2SiF_6$ or $Na_2SiF_6$.

A $B_2O_3$ component promotes a stable glass formation the same as the $SiO_2$ component does and it is an inevitable component for achieving a small average linear expansion coefficient. However, when its amount is too small, stable glass is hardly resulted while, when its amount is too much, a refractive index (nd) is apt to become small and an optical elasticity constant β tends to significantly increase whereby the desired characteristic is hardly available. Its upper limit is preferably 35% by mass, more preferably 34% by mass and, most preferably, 33% by mass while its lower limit is preferably 8.0% by mass, more preferably 8.5% by mass and, most preferably, 9.0% by mass. The $B_2O_3$ component is able to be contained therein in a material form such as $H_3BO_3$, $Na_2B_4O_7$, $Na_2B_4O_7.10H_2O$ or $BPO_4$ and it is preferred to be introduced in a form of $H_3BO_3$.

As a result of making the ratio of $SiO_2/B_2O_3$ less than 0.6 in terms of % by mass, not only an effect of increasing the fusing property of the material and the stability of glass is achieved but also an effect of suppressing the increase of an average linear expansion coefficient α is achieved. When it exceeds the upper limit, it may happen that the average linear expansion coefficient α increases and further that melted residue (hardly-fusible crystals mostly containing $SiO_2$) upon fusion of the glass is generated whereby the productivity becomes bad and the inner quality is badly affected. More preferred range of % by mass is 0.03 to 0.59 and most preferred one is within a range of 0.05 to 0.58.

In addition to the effect of enhancing the refractive index and making the dispersion small (making the Abbe's number large), the $La_2O_3$ component also has an action of making the optical elasticity constant β small. However, if it is contained too much, glass becomes significantly unstable and is apt to be devitrified. Accordingly, its upper limit is preferably 50% by mass, more preferably 49.5% by mass and, most preferably, 49.0% by mass while its lower limit is preferably 25% by mass, more preferably 25.5% by mass and, most preferably, 26% by mass. The $La_2O_3$ component is able to be contained therein in any material form and it is preferred to be introduced thereinto in a form of an oxide ($La_2O_3$) and a nitrate or a nitrate hydride (La $(NO_3)_3.xH_2O$ where x is any integer).

The optical glass according to the above constitution 2 is characterized in having optical constants of such ranges where a refractive index (nd) is 1.75 to 2.00 and an Abbe's number (vd) is 35 to 55 and it is useful for various optical elements and optical designs.

The above-mentioned optical constants are useful in an optical design particularly because miniaturization of an optical system is possible (The characteristic of a high refractive index that a refractive index is not less than 1.75 is able to afford a big refractive amount of light even in the case of a thin lens and the low dispersing characteristic that the Abbe's number is not less than 35 is able to make the shift of focus (chromatic aberration) small even in the case of a single lens.).

In the optical glass of the above constitutions 1 and 2, a $Gd_2O_3$ component gives an effect of making the refractive index high and making the dispersion small the same as an $La_2O_3$ component does but, when it is contained too much, devitrification is apt to happen the same as in the case of the $La_2O_3$ component. Accordingly, its upper limit is preferably 40% by mass, more preferably 39% by mass and, most preferably, 38% by mass. The $Gd_2O_3$ component is able to be contained therein in any material form and it is preferred to be introduced thereinto in a form of an oxide ($Gd_2O_3$) or a fluoride ($GdF_3$).

Although an $Y_2O_3$ has an effect of adjusting the refractive index and the dispersion, there is a risk that the desired optical constants are not achieved if it is contained too much. Its upper limit is preferably 15% by mass, more preferably 14.5% by mass and, most preferably, 14.0% by mass. The $Y_2O_3$ component is able to be contained therein in any material form and it is preferred to be introduced thereinto in a form of an oxide ($Y_2O_3$) or a fluoride ($YF_3$)

Although there is no particular technical disadvantage if the range is mentioned as above, its amount is preferred to be less than 3.5% by mass when a production cost is taken into consideration because $Y_2O_3$ is the rarest mineral resource among the components which are able to achieve the characteristics of a high refractive index and a low dispersion.

A $ZrO_2$ component has an effect of enhancing the refractive index (nd) and improving the resistance to devitrification but, since the $ZrO_2$ component is a hardly fusing component, fusing at high temperature is forced in the manufacture of glass if it is contained too much and the loss in energy is apt to cause a problem. On the other hand, there are some cases where an effect of suppressing the devitrification is achieved when a predetermined amount is contained. Accordingly, its upper limit is preferably 15% by mass, more preferably 13% by mass and, most preferably, 12% by mass while its lower limit is preferably 1% by mass, more preferably 2% by mass and, most preferably, 3% by mass. When no devitrification is resulted in the glass even if no $ZrO_2$ component is added, the component may not be added. The $ZrO_2$ component is able to be introduced in any material form and it is preferred to be introduced in a form of an oxide ($ZrO_2$) or a fluoride ($ZrF_4$).

Since a $Ta_2O_5$ component has an effect of enhancing the refractive index to stabilize the glass, it may be optionally contained. However, the $Ta_2O_5$ component is a rare mineral resource, has a high material price, is a hardly melting component and forces a fusion at high temperature in the manufacture of glass whereby it has a characteristic that not only production cost increases but also an optical elasticity constant β increases. Accordingly, the upper limit of its content is preferably 25% by mass. More preferred upper limit is 22% by mass and the most preferred upper limit is 19% by mass. Although the $Ta_2O_5$ component is able to be introduced in any material form, it is preferred to be introduced in a form of an oxide ($Ta_2O_5$).

An $Nb_2O_5$ component has an effect of increasing the refractive index and stabilizing the glass the same as a $Ta_2O_5$ component does and it may be optionally contained within a range of 0 to 18% by mass. However, the $Nb_2O_5$ component is a hardly melting component and forces a fusion at high temperature in the manufacture of glass whereby it has a characteristic that not only production cost increases but also an optical elasticity constant $\beta$ increases. Accordingly, the upper limit of its content is preferably 18% by mass. More preferred upper limit is 16% by mass and the most preferred upper limit is 14% by mass. Although the $Nb_2O_5$ component is able to be introduced in any material form, it is preferred to be introduced in a form of an oxide ($Nb_2O_5$).

A $WO_3$ component has an effect of adjusting the refractive index and the dispersion and of improving the resistance of the glass to devitrification. However, when it is contained too much, coloration of the glass is significant and transmittance particularly in the visible to short wave regions (shorter than 500 nm) becomes low and that is not preferred. Accordingly, its upper limit is preferably 10% by mass, more preferably 8% by mass and, most preferably, 6% by mass. Although the $WO_3$ component is able to be introduced in any material form, it is preferred to be introduced in a form of an oxide ($WO_3$).

In the optical glass of the above constitution 4, a $GeO_2$ component may be optionally added within a range of 0.0 to 0.1% by mass for adjustment of the refractive index and for adjustment of viscosity of the fused glass. However, sine it is a rare mineral resource and is expensive, it is preferred not to be contained at all. Although each of $Yb_2O_3$, $Ga_2O_3$ and $Bi_2O_3$ may be optionally added for adjustment of the refractive index, it has a property of increasing the optical elasticity constant $\beta$ and, therefore, its upper limit is 1.0% by mass. However, since those components are also rare mineral resources, more preferred upper limit is 0.5% by mass and, most preferably, nothing is added at all. Each of $GeO_2$, $Yb_2O_3$, $Ga_2O_3$ and $Bi_2O_3$ components may be introduced in any material form and it is preferred to be introduced in a form of an oxide ($GeO_2$, $Yb_2O_3$, $Ga_2O_3$ and $Bi_2O_3$).

Since a lead compound such as PbO and an arsenic compound such as $As_2O_3$ are components having high environmental loads, it is preferred not to be contained at all except in the case of unavoidable mixing-in.

In the optical glass according to the above constitutions 5 and 6, the product of $\alpha$ and $\beta$ is preferably not more than $100 \times 10^{-12 \circ}$ $C.^{-1} \times nm \times cm^{-1} \times Pa^{-1}$ and, most preferably, not more than $90 \times 10^{-12 \circ}$ $C.^{-1} \times nm \times cm^{-1} \times Pa^{-1}1$ for utilizing in optical elements of higher precision and higher definition.

When the value of $\alpha \times \beta$ is smaller, an image forming characteristic in the actually using environment becomes faithful to the optically designed value calculated on the basis of the optical property near the room temperature and, therefore, there is an advantage that it is not necessary to conduct a complicated optical simulation with a presumption of various using environments.

In the optical glass of the constitution 7, the ratio of $(Ta_2O_5+Nb_2O_5+WO_3)/(Gd_2O_3+Y_2O_3)$ in terms of % by mass which is the ratio in terms of % by mass of the total amount of $Ta_2O_5$, $Nb_2O_5$ and $WO_3$ having a strong effect of enhancing the dispersion to the total amount of $Gd_2O_3$ and $Y_2O_3$ having an effect of reducing the dispersion is made within a range of more than 0.05 and less than 1.30 whereby the desired Abbe's number (35 to 55) is apt to be achieved, so the above range is preferred. More preferably, it is within a range of 0.055 to 1.29 and, most preferably, it is within a range of 0.06 to 1.28.

When the components within the mentioned range are contained in the optical glass of the constitution 8, the characteristics mentioned in the constitution 1 to 7 are able to be stably achieved. Reasons for limitation of each component will be illustrated as follows.

Since the alkali metal oxide components ($Li_2O$, $Na_2O$, $K_2O$ and $Cs_2O$) give an effect of enhancing the fusing property of the glass, it may be optionally contained but, when they are contained too much, it is apt to happen that an average linear expansion coefficient $\alpha$ increases or a refractive index lowers whereby the glass becomes unstable and undesired phenomenon such as devitrification is resulted and, accordingly, each of them is preferred to be made within a range of 0.0 to 5.0% in terms of % by mass. More preferred upper limits are 4.5% for an $Li_2O$ component, an $Na_2O$ component and a $K_2O$ component and 4.0% for a $Cs_2O$ component. The most preferred upper limit for an $Li_2O$ component is 2.0% and, with regard to the components of $Na_2O$, $K_2O$ and $Cs_2O$, they are not contained at all. Although the alkali metal oxide components may be introduced in various forms such as a carbonate ($Li_2CO_3$, $Na_2CO_3$, $K_2CO_3$ and $Cs_2CO_3$), a nitrate ($LiNO_3$, $NaNO_3$, $KNO_3$ and $CsNO_3$), a fluoride (LiF, NaF, KF and $KHF_2$) and a complex salt ($Na_2SiF_6$ and $K_2SiF_6$), it is preferred to be introduced in a form of a carbonate and/or a nitrate.

Alkali earth metal oxide components (MgO, CaO, SrO and BaO) give an effect of adjusting the refractive index and the optical elasticity constant of the glass and, therefore, they are able to be optionally contained but, if they are contained too much, desired optical constants (particularly, a refractive index) are apt to be hardly achieved whereby each of them is preferred to be contained within a range of 0.0 to 5.0% in terms of % by mass. More preferred upper limit is 4.0% for the MgO component and the CaO component and 4.5% for the SrO component and the BaO component. The most preferred upper limit is that no MgO component is contained at all and is 3.0% for the CaO component and 4.0% for the SrO component and the BaO component. Although the alkali earth metal oxide components may be introduced in various forms such as a carbonate ($MgCO_3$, $CaCO_3$ and $BaCO_3$), a nitrate ($Sr(NO_3)_2$ and $Ba(NO_3)_2$) and a fluoride ($MgF_2$, $CaF_2$, $SrF_2$ and $BaF_2$), it is preferred to be introduced in a form of a carbonate and/or a nitrate and/or a fluoride.

The $TiO_2$ component is able to be optionally contained for adjustment of a refractive index and an Abbe's number but, when it is contained excessively, coloration of the glass is apt to become significant and, particularly, transmittance of the visible short wavelength (500 nm and shorter) tends to become bad. Accordingly, its preferred upper limit is 3.0% by mass, the more preferred upper limit is 2.5% by mass and the most preferred upper limit is 2.0% by mass. Although the $TiO_2$ component may be introduced in any material form, it is preferred to be contained in a form of an oxide ($TiO_2$).

An $SnO_2$ component gives an effect of suppressing the oxidation of the fused glass and making it clear and of preventing the worsening of transmittance to irradiation of light and, therefore, it may be optionally contained. However, if it is contained excessively, there is a risk of coloration of the glass due to reduction of fused glass and of giving an alloy with the fusing device (particularly, noble metal such as Pt). Its upper limit is preferably 3.0% by mass, more preferably 2.0% by mass and, most preferably, 1.0% by mass. Although the $SnO_2$ component may be introduced in any material form, it is preferred to be introduced in a form of an oxide (SnO and $SnO_2$) or a fluoride ($SnF_2$ and $SnF_4$). An $Al_2O_3$ component is able to give an effect of enhancing the chemical durability of the optical glass and the optical element and of improving the resistance of the fused glass to devitrification and, therefore, it may be optionally contained.

However, if it is contained excessively, it is apt to happen that a refractive index significantly lowers and an optical elasticity constant becomes too big. Accordingly, its upper limit is preferably 3.0% by mass, more preferably 2.0% by mass and, most preferably, 1.0% by mass. Although the $Al_2O_3$ component may be introduced in any material form, it is preferred to be introduced in a form of an oxide ($Al_2O_3$), a hydroxide ($Al(OH)_3$) or a fluoride ($AlF_3$).

A $P_2O_5$ component gives an effect of improving the fusing property of the glass and, therefore, it may be optionally contained but, when it is contained too much, it is apt to happen that resistance of glass to devitrification becomes significantly bad and an optical glass having no devitrification is hardly available. Accordingly, its upper limit is preferably 5.0% by mass, more preferably 1.0% by mass and, most preferably, it is not contained at all. Although the $P_2O_5$ component may be introduced in any material form, it is preferred to be introduced in a form of $Al(PO_3)_3$, $Ca(PO_3)_2$, $Ba(PO_3)_2$, $BPO_4$ or $H_3PO_4$.

A ZnO component has an effect of improving the fusing property of the glass and also making an average linear expansion coefficient $\alpha$ small and, therefore, it is able to be optionally contained within a range of 0 to 10.0% by mass. Since it has a property of significantly increasing the optical elasticity constant $\beta$, a desired characteristic is apt to be hardly available if it is contained excessively. The more preferred range is less than 5.0% by mass and the most preferred range is less than 2.0% by mass. Preferably, the lower limit is 0.1% by mass. Although the ZnO component may be introduced in any material form, it is preferred to be introduced in a form of an oxide (ZnO) and/or a fluoride ($ZnF_2$).

An $Lu_2O_3$ component gives an effect of achieving a high refractive index and a low dispersion the same as the $La_2O_3$, $Gd_2O_3$ and $Y_2O_3$ components do and, therefore, it is able to be optionally contained within a range of 0 to 5.0% by mass. However, since it is a rare mineral resource, it is not preferred to contain excessively. Its upper limit is more preferably 3.0% by mass and, most preferably, it is not contained at all. Although the $Lu_2O_3$ is able to be introduced in any material form, it is preferred to be introduced in a form of an oxide ($Lu_2O_3$).

A $TeO_2$ component gives an effect of promoting the clarifying action upon fusion of the glass and, therefore, it is able to be optionally contained within a range of 0 to 3.0% by mass. However, when it is contained excessively, coloration of the glass is significant and transmittance is apt to become bad. More preferred upper limit is 1.5% by mass and, most preferably, it is not contained at all. Although the $TeO_2$ component is able to be introduced in any material form, it is preferred to be introduced in a form of an oxide ($TeO_2$).

An $Sb_2O_3$ has an effect as a defoaming agent for glass and, therefore, it is able to be optionally contained within a range of 0 to 2.0% by mass. However, when it is contained more than the upper limit, there is a risk that an excessive foaming is apt to happen upon fusion of the glass or it may form an alloy with a fusing device (particularly a noble metal such as Pt) and, therefore, it is preferred that more than the upper limit is not contained. Although the $Sb_2O_3$ component may be introduced in any material form, it is preferred to be introduced in a form of an oxide ($Sb_2O_3$ and $Sb_2O_5$) or $Na_2H_2Sb_2O_7 \cdot 5H_2O$.

An F component gives an effect of making the Abbe's number big or making the optical elasticity constant $\beta$ small and, therefore, it is able to be optionally contained within a range of 0 to 3.0% by mass. However, when it is contained in an amount of more than the upper limit, there is a risk that a refractive index becomes low and an average linear expansion coefficient $\alpha$ increases. More preferred upper limit is 2.8% by mass and the most preferred upper limit is 2.5% by mass. The F component is introduced into the glass when the material form is introduced in a form of a fluoride in the introduction of the above-mentioned various kinds of oxides.

The expression of amount of each component used in this specification on the basis of an oxide means % by mass of the corresponding resulted oxide of each component to the total component with a presumption that all of oxides, composite salts, metal fluorides, etc. used as materials of the constituting components of the glass of the invention are decomposed upon fusion to convert into oxides and, in the case of a fluoride, mass of the actually contained fluorine atoms to the mass of the resulting oxide is expressed in terms of % by mass.

Various kinds of transition metal components such as V, Cr, Mn, Fe, Co, Ni, Cu, Ag and Mo except Ti are colored even when each of them is contained in small amount either solely or jointly whereby absorption in the specific wavelength in visible region is resulted. Therefore, in the case of an optical glass using the wavelength of visible region, it is preferred that they are not substantially contained. Further, there is a tendency that the use of Pb, Th, Cd, Tl, As, Os, Be and Se components is decreasing as a harmful chemical substance and it is necessary to take an action in view of environmental measure not only in the manufacturing steps for glass but also in processing steps and disposal after making into a product. Consequently, it is preferred that those components are not substantially contained when much importance is to be paid to environmental influence.

In the optical glass of the above-mentioned constitution 11, the ratio of the total amount of $ZrO_2$, $Ta_2O_5$ and $Nb_2O_5$ which are hardly-fusing component to the total amount of $SiO_2$ and $B_2O_3$ which are glass-forming components, i.e. ($ZrO_2+Ta_2O_5+Nb_2O_5$)/($SiO_2+B_2O_3$) is made less than 1.00 in terms of % by mass whereby there is achieved an effect that there is no necessity of making the glass fusing temperature significantly high and consumption of energy is able to be reduced. When the above ratio is more than 1.00, since each of $Ta_2O_5$ and $Nb_2O_5$ components is a rare mineral resource, there is a risk that, the more the ratio, the higher the material cost and further that the amount of the glass-forming components becomes relatively small whereby glass becomes unstable. Moreover, there is a risk that the relative amount of $ZrO_2$, $Ta_2O_5$ and $Nb_2O_5$ which increase the optical elasticity coefficient becomes high and that of $B_2O_3$ which has an effect of lowering the average linear expansion coefficient $\alpha$ whereby the product of $\alpha$ and $\beta$ increases. Thus, the above is not preferred for the production of the desired optical glass cheaply.

In the optical glass of the above constitution 12, the $Y_2O_3$ component which is the rarest mineral resource among the components which are able to achieve the characteristics of the high refractive index and the low dispersion is made less than 3.5% by mass whereby an effect of reducing the manufacturing cost and producing the glass in a stable and everlasting manner is able to be achieved. Further the ratio of ($ZnO+Y_2O_3$)/$La_2O_3$ in terms of % by mass is more than 0 and less than 0.5 whereby an effect of stable formation of an optical glass giving the desired production of $\alpha$ and $\beta$ is able to be achieved. Furthermore, the sum of $ZrO_2+Nb_2O_5$ in terms of % by mass is more than 5.0% and less than 13.0% whereby an effect of limiting the amount of the hardly fusing components, suppressing the energy consumption and providing an optical glass having an excellent resistance to devitrification is able to be achieved.

In the optical glass of the above constitution 13, the range of the constitution component ratio in the most suitable optical glass among the above optical glass products of the above constitutions 1 to 12 is made clear. To be more specific, the composition of the glass is maintained to the following ones, i.e.

more than 1.0% by mass and less than 10.0% by mass of $SiO_2$,
15.0 to 28.0% by mass of $B_2O_3$,
28.0 to 35.0% by mass of $La_2O_3$,
25.0 to 35.0% by mass of $Gd_2O_3$,
5.0 to 9.0% by mass of $ZrO_2$ and
0.1 to less than 2.0% by mass of ZnO and
0.0 to 6.0% by mass of $Ta_2O_5$ and/or
0.0 to 5.0% by mass of $Nb_2O_5$ and/or
0.0 to 1.0% by mass of $Sb_2O_3$ and/or
0.0 to less than 1.0% by mass of $Al_2O_3$
whereby there is an advantage that an optical glass in which optical constants are within such ranges that the refractive index (nd) is 1.78 to 1.83 and the Abbe's number (vd) is 44 to 48 and the product of α and β where α is an average linear expansion coefficient at −30° C. to +70° C. and β is an optical elasticity constant at the wavelength of 546.1 nm is not more than $90 \times 10^{-12}$ °$C.^{-1} \times nm \times cm^{-1} \times Pa^{-1}$ is able to be stably prepared. When the constituting components and the amounts thereof are made within a ratio of the predetermined range as such, the use of hardly fusing components and rare mineral resources is suppressed to a minimum extent and production of an optical element for the use of high precision and high definition where changes in image forming characteristic under the using environment is little is now possible without the use of the components having a high load on environments.

As mentioned in the constitutions 14 to 16, the optical glass mentioned in the above constitutions 1 to 13 is useful as a mother material for the preparation of optical elements such as lenses and prisms and, when the optical elements are utilized for cameras and projectors, image formation and projection characteristic with high precision and high definition are able to be achieved.

Since the composition is expressed in terms of % by mass in the glass composition of the invention, it is unable to be directly expressed in terms of mol %. However, the composition of each of the components in terms of mol % existing in the glass composition satisfying various characteristics demanded in the invention has almost the following values.

As to the range for the constitution 1, it is 2.0 to 25.0 mol % for $SiO_2$, 25 to 65 mol % for $B_2O_3$, more than 0 to less than 0.7 in terms of the molar % ratio for $SiO_2/B_2O_3$ and 10 to 30 mol % for $La_2O_3$.

As to the range for the constitution 3, it is 0 to 18 mol % for $Gd_2O_3$, 0 to 10 mol % for $Y_2O_3$, 0 to 10 mol % for $ZrO_2$, 0 to 10 mol % for $Ta_2O_5$, 0 to 10 mol % for $Nb_2O_5$ and 0 to 5 mol % for $WO_3$.

As to the range for the constitution 4, it is 0.0 to 0.1 mol % for $GeO_2$, 0.0 to 1.0 mol % for $Yb_2O_3$, 0.0 to 1.0 mol % for $Ga_2O_3$ and 0.0 to 1.0 mol % for $Bi_2O_3$.

As to the range for the constitution 7, the ratio in terms of mol % for $(Ta_2O_5+Nb_2O_5+WO_3)/(Gd_2O_3+Y_2O_3)$ is more than 0.03 and less than 1.25.

As to the range for the constitution 8, that in terms of mol % is as follows.
0 to 7.0% for $Li_2O$,
0 to 5.0% for $Na_2O$,
0 to 5.0% for $K_2O$,
0 to 3.0% for $Cs_2O$,
0 to 5.0% for MgO,
0 to 5.0% for CaO,
0 to 5.0% for SrO,
0 to 5.0% for BaO,
0 to 5.0% for $TiO_2$,
0 to 3.0% for $SnO_2$,
0 to 3.0% for $Al_2O_3$,
0 to 3.0% for $P_2O_5$,
0 to 7.0% for ZnO,
0 to 2.0% for $Lu_2O_3$,
0 to 1.0% for $TeO_2$,
0 to 1.0% of $Sb_2O_3$ and
0 to 10% for F.

As to the range for the constitution 9, it is less than 5.0 mol % for ZnO.

As to the range for the constitution 10, it is less than 4.0 mol % for $Y_2O_3$.

As to the range for the constitution 11, the mol % ratio is less than 0.8 for $(ZrO_2+Ta_2O_5+Nb_2O_5)/(SiO_2+B_2O_3)$.

As to the range for the constitution 12, it is less than 4.0 mol % for $Y_2O_3$, the mol % ratio is more than 0 and less than 1.0 for $(ZnO+Y_2O_3)/La_2O_3$ and the mol % sum is more than 5.0% and less than 13.0% for $(ZrO_2+Nb_2O_5)$.

As to the range for the constitution 13, it is 3 to 22 mol % for $SiO_2$, 27 to 63 mol % for $B_2O_3$, 10 to 25 mol % for $La_2O_3$, 6 to 15 mol % for $Gd_2O_3$, 4 to 10 mol % for $ZrO_2$, 0.1 to 2.0 mol % for ZnO, 0 to 5.0 mol % for $Ta_2O_5$, 0 to 3 mol % for $Nb_2O_5$, 0 to 0.5 mol % for $Sb_2O_3$ and 0 to less than 1.0 mol % for $Al_2O_3$.

EXAMPLES

Now the invention will be illustrated in more detail by way of the following Examples although the invention is not limited to those Examples.

Tables 1 to 8 show glass composition, refractive index (nd), Abbe's number (vd), average linear expansion coefficient α at −30 to +70° C., optical elasticity coefficient β at the wavelength of 546.1 nm, product of α and β and ratio and sum of the amounts of various components for Examples (1 to 38) which are suitable for the production of optical glass with a high refractive index and a low dispersion where the refractive index (nd) is not less than 1.75 and the Abbe's number (vd) is not more than 35 in which image formation characteristic is hardly affected by changes in the temperature in the using environment.

Table 9 shows glass compositions and various properties of Comparative Examples (A to C) for known optical glass products. In this table, Comparative Example A is Example 6 in JP-A-2005-306732, Comparative Example B is Example 1 in JP-A-2002-284542 and Comparative Example C is Example 7 in JP-A-2004-161506. The refractive indexes (nd) and Abbe's numbers (vd) in the table are those mentioned in each of the above gazettes.

For the optical glass prepared, its refractive index (nd), Abbe's number (vd), average linear expansion coefficient (α) at −30° to +70° C. and optical elasticity coefficient (β) at the wavelength of 546.1 nm were measured as follows.

(1) Refractive Index (nd) and Abbe's Number (vd)

Measurements were conducted for the optical glass where the temperature lowering rate with a gradual cooling was made −25° C./hour.

(2) Average Linear Expansion Coefficient (α) at −30 to +70° C.

Measurement was conducted in accordance with the method mentioned in the stipulations by the Japan Optical Glass Industry Association (JOGIS 16-2003) (a method for the measurement of average linear expansion coefficient of optical glass at about ambient temperature). As a test piece, a sample of 50 mm length and 4 mm diameter was used.

(3) Optical Elasticity Constant (β) at the Wavelength of 546.1 nm

An optical elasticity constant (β) was determined in such a manner that the shape of a sample was made into a disk of 25 mm diameter and 8 mm thickness after subjecting to a face-to-face polishing, a compressing load was applied in the predetermined direction, an optical path difference generated in the center of the glass was measured and calculation was conducted according to the formula $\delta = \beta \cdot d \cdot F$. A super-high voltage mercury lamp was used as a light source for the measurement at 546.1 nm. In the above formula, optical path difference, glass thickness and stress are given as $\delta$ (nm), d (cm) and F (Pa), respectively.

TABLE 1

| % by mass | 1 | 2 | 3 | 4 | 5 |
|---|---|---|---|---|---|
| $SiO_2$ | 2.62 | 2.60 | 2.60 | 2.60 | 2.60 |
| $B_2O_3$ | 31.20 | 31.22 | 31.22 | 29.22 | 30.21 |
| $Al_2O_3$ | | | | | |
| $P_2O_5$ | | | | | |
| $Y_2O_3$ | 11.70 | 10.70 | 10.70 | 10.70 | 1.75 |
| $La_2O_3$ | 44.31 | 45.31 | 44.31 | 45.31 | 45.19 |
| $Gd_2O_3$ | | | | | |
| $Yb_2O_3$ | | | | | |
| $Lu_2O_3$ | | | 1.00 | | |
| $TiO_2$ | | | | | |
| $ZrO_2$ | 6.60 | 6.60 | 6.60 | 6.50 | 6.60 |
| $SnO_2$ | | | | | |
| $TeO_2$ | | | | 0.10 | |
| $Nb_2O_5$ | 1.62 | 1.62 | 1.62 | 1.62 | 2.71 |
| $Ta_2O_5$ | | | | | |
| $WO_3$ | | | | | |
| ZnO | 0.90 | 0.90 | 0.90 | 0.90 | 0.90 |
| MgO | | | | | |
| CaO | | | | | |
| SrO | 1.00 | 1.00 | 1.00 | 1.00 | 1.00 |
| BaO | | | | | |
| $Li_2O$ | | | | | |
| $Na_2O$ | | | | 1.00 | |
| $K_2O$ | | | | | |
| $Cs_2O$ | | | | | |
| $Sb_2O_3$ | 0.05 | 0.05 | 0.05 | 0.05 | 0.04 |
| F | | | | | 1.00 |
| Total | 100.00 | 100.00 | 100.00 | 100.00 | 100.00 |
| α | 62 | 62 | 62 | 64 | 62 |
| β | 1.44 | 1.43 | 1.43 | 1.40 | 1.42 |
| α × β | 89.28 | 88.66 | 88.66 | 89.60 | 88.04 |
| nd | 1.772 | 1.773 | 1.773 | 1.773 | 1.780 |
| νd | 49.6 | 49.6 | 49.6 | 50.0 | 48.5 |
| $SiO_2/B_2O_3$ | 0.084 | 0.083 | 0.083 | 0.089 | 0.086 |
| $(Ta_2O_5 + Nb_2O_5 + WO_3)/(Gd_2O_3 + Y_2O_3)$ | 0.138 | 0.151 | 0.151 | 0.151 | 0.252 |
| $(ZrO_2 + Ta_2O_5 + Nb_2O_5)/(SiO_2 + B_2O_3)$ | 0.243 | 0.243 | 0.243 | 0.255 | 0.284 |
| $(ZnO + Y_2O_3)/La_2O_3$ | 0.284 | 0.256 | 0.262 | 0.256 | 0.258 |
| $ZrO_2 + Nb_2O_5$ | 8.22 | 8.22 | 8.22 | 8.12 | 9.31 |

TABLE 2

| % by mass | 6 | 7 | 8 | 9 | 10 |
|---|---|---|---|---|---|
| $SiO_2$ | 2.00 | 2.60 | 2.60 | 2.32 | 2.60 |
| $B_2O_3$ | 29.00 | 29.20 | 29.20 | 27.87 | 28.20 |
| $Al_2O_3$ | | | | | |
| $P_2O_5$ | 0.54 | | | | |
| $Y_2O_3$ | | 8.80 | 10.80 | | 10.80 |
| $La_2O_3$ | 29.49 | 47.06 | 45.06 | 39.02 | 45.06 |
| $Gd_2O_3$ | 26.97 | | | 18.89 | |
| $Yb_2O_3$ | | | | | |
| $Lu_2O_3$ | | | | | |
| $TiO_2$ | | 0.50 | | | |
| $ZrO_2$ | 6.71 | 6.60 | 6.60 | 6.66 | 6.60 |
| $SnO_2$ | | | | | |
| $TeO_2$ | 0.05 | | | 0.04 | |
| $Nb_2O_5$ | 2.96 | 3.30 | 3.80 | 3.75 | 3.80 |
| $Ta_2O_5$ | 2.28 | | | | |
| $WO_3$ | | | | | 0.50 |
| ZnO | | 0.90 | 0.90 | 0.95 | 0.90 |
| MgO | | | | | |
| CaO | | | | | |
| SrO | | 1.00 | 1.00 | | 0.50 |
| BaO | | | | | |
| $Li_2O$ | | | | 0.50 | |
| $Na_2O$ | | | | | |
| $K_2O$ | | | | | 1.00 |
| $Cs_2O$ | | | | | |
| $Sb_2O_3$ | | 0.04 | 0.04 | | 0.04 |
| F | | | | | |
| Total | 100.00 | 100.00 | 100.00 | 100.00 | 100.00 |
| α | 60 | 61 | 61 | 61 | 61 |
| β | 1.46 | 1.38 | 1.40 | 1.42 | 1.40 |
| α × β | 87.60 | 84.18 | 85.40 | 86.62 | 85.40 |
| nd | 1.783 | 1.788 | 1.788 | 1.788 | 1.789 |
| νd | 47.3 | 47.4 | 47.4 | 48.1 | 47.3 |
| $SiO_2/B_2O_3$ | 0.069 | 0.089 | 0.089 | 0.083 | 0.092 |
| $(Ta_2O_5 + Nb_2O_5 + WO_3)/(Gd_2O_3 + Y_2O_3)$ | 0.194 | 0.375 | 0.352 | 0.199 | 0.398 |
| $(ZrO_2 + Ta_2O_5 + Nb_2O_5)/(SiO_2 + B_2O_3)$ | 0.385 | 0.311 | 0.327 | 0.345 | 0.338 |
| $(ZnO + Y_2O_3)/La_2O_3$ | 0 | 0.206 | 0.260 | 0.024 | 0.260 |
| $ZrO_2 + Nb_2O_5$ | 9.67 | 9.90 | 10.40 | 10.41 | 10.40 |

TABLE 3

| % by mass | 11 | 12 | 13 | 14 | 15 |
|---|---|---|---|---|---|
| $SiO_2$ | 2.60 | 2.30 | 2.00 | 2.00 | 2.00 |
| $B_2O_3$ | 29.00 | 27.87 | 26.54 | 26.54 | 26.64 |
| $Al_2O_3$ | | | 0.10 | | |
| $P_2O_5$ | | | | | |
| $Y_2O_3$ | 12.86 | 5.40 | | | |
| $La_2O_3$ | 43.00 | 38.76 | 32.49 | 32.49 | 32.49 |
| $Gd_2O_3$ | | 13.50 | 26.98 | 26.97 | 26.97 |
| $Yb_2O_3$ | | | | | |
| $Lu_2O_3$ | | | | | |
| $TiO_2$ | | | | | |
| $ZrO_2$ | 6.60 | 6.66 | 7.29 | 6.71 | 6.71 |
| $SnO_2$ | | | | | |
| $TeO_2$ | | | | | |
| $Nb_2O_5$ | 3.80 | 3.38 | 3.56 | 2.96 | 3.56 |
| $Ta_2O_5$ | | 1.14 | | 0.28 | |
| $WO_3$ | | | | | |
| ZnO | 1.10 | 0.45 | 1.00 | 2.00 | 1.00 |
| MgO | | 0.50 | | | |
| CaO | | | | | |
| SrO | 1.00 | | | | |
| BaO | | | | | 0.68 |
| $Li_2O$ | | | | | |
| $Na_2O$ | | | | | |
| $K_2O$ | | | | | |
| $Cs_2O$ | | | | | |
| $Sb_2O_3$ | 0.04 | 0.04 | 0.04 | 0.05 | 0.05 |
| F | | | | | |
| Total | 100.00 | 100.00 | 100.00 | 100.00 | 100.00 |
| α | 61 | 60 | 61 | 61 | 63 |
| β | 1.43 | 1.43 | 1.43 | 1.43 | 1.40 |
| α × β | 87.23 | 85.80 | 87.23 | 87.23 | 88.20 |
| nd | 1.789 | 1.796 | 1.799 | 1.800 | 1.801 |
| νd | 47.3 | 47.0 | 46.3 | 47.0 | 46.7 |
| $SiO_2/B_2O_3$ | 0.090 | 0.083 | 0.075 | 0.075 | 0.075 |
| $(Ta_2O_5 + Nb_2O_5 + WO_3)/(Gd_2O_3 + Y_2O_3)$ | 0.295 | 0.239 | 0.132 | 0.120 | 0.132 |
| $(ZrO_2 + Ta_2O_5 + Nb_2O_5)/(SiO_2 + B_2O_3)$ | 0.329 | 0.371 | 0.380 | 0.349 | 0.360 |
| $(ZnO + Y_2O_3)/La_2O_3$ | 0.325 | 0.151 | 0.031 | 0.062 | 0.031 |
| $ZrO_2 + Nb_2O_5$ | 10.40 | 10.04 | 10.85 | 9.67 | 10.27 |

TABLE 4

| % by mass | 16 | 17 | 18 | 19 | 20 |
|---|---|---|---|---|---|
| $SiO_2$ | 2.15 | 2.00 | 2.04 | 2.00 | 7.49 |
| $B_2O_3$ | 26.54 | 26.54 | 26.54 | 26.54 | 17.71 |
| $Al_2O_3$ | | | | | |
| $P_2O_5$ | | | | | |
| $Y_2O_3$ | | | | 5.00 | |
| $La_2O_3$ | 32.49 | 32.45 | 32.99 | 32.48 | 29.81 |
| $Gd_2O_3$ | 26.98 | 27.00 | 26.97 | 15.98 | 31.06 |
| $Yb_2O_3$ | | | | | |
| $Lu_2O_3$ | | | | | |
| $TiO_2$ | | | | | |
| $ZrO_2$ | 6.71 | 6.72 | 6.72 | 6.71 | 7.04 |
| $SnO_2$ | | | | | 0.60 |
| $TeO_2$ | | | | | |
| $Nb_2O_5$ | 4.09 | 2.96 | 3.69 | 2.96 | |
| $Ta_2O_5$ | | 2.28 | | 2.28 | 2.25 |
| $WO_3$ | | | | | |
| $ZnO$ | 1.00 | | 1.00 | | 1.00 |
| $MgO$ | | | | | |
| $CaO$ | | | | | |
| $SrO$ | | | | | |
| $BaO$ | | | | | 3.00 |
| $Li_2O$ | | | | | |
| $Na_2O$ | | | | | |
| $K_2O$ | | | | | |
| $Cs_2O$ | | | | 1.00 | |
| $Sb_2O_3$ | 0.04 | 0.05 | 0.05 | 0.05 | 0.04 |
| F | | | | | |
| Total | 100.00 | 100.00 | 100.00 | 100.00 | 100.00 |
| α | 59 | 60 | 61 | 61 | 65 |
| β | 1.48 | 1.42 | 1.41 | 1.41 | 1.30 |
| α × β | 87.32 | 85.20 | 86.01 | 86.01 | 84.50 |
| nd | 1.803 | 1.804 | 1.804 | 1.805 | 1.806 |
| νd | 45.9 | 46.6 | 46.6 | 46.5 | 47.4 |
| $SiO_2/B_2O_3$ | 0.081 | 0.075 | 0.077 | 0.075 | 0.423 |
| $(Ta_2O_5 + Nb_2O_5 + WO_3)/(Gd_2O_3 + Y_2O_3)$ | 0.152 | 0.194 | 0.137 | 0.250 | 0.072 |
| $(ZrO_2 + Ta_2O_5 + Nb_2O_5)/(SiO_2 + B_2O_3)$ | 0.376 | 0.419 | 0.364 | 0.419 | 0.369 |
| $(ZnO + Y_2O_3)/La_2O_3$ | 0.031 | 0 | 0.030 | 0.133 | 0.034 |
| $ZrO_2 + Nb_2O_5$ | 10.80 | 9.68 | 10.41 | 9.67 | 7.04 |

TABLE 5

| % by mass | 21 | 22 | 23 | 24 | 25 |
|---|---|---|---|---|---|
| $SiO_2$ | 7.49 | 7.51 | 7.52 | 7.52 | 7.50 |
| $B_2O_3$ | 17.71 | 18.33 | 18.02 | 17.94 | 17.76 |
| $Al_2O_3$ | | | | | |
| $P_2O_5$ | | | | | |
| $Y_2O_3$ | 3.00 | | | | |
| $La_2O_3$ | 29.81 | 32.41 | 31.75 | 31.34 | 29.71 |
| $Gd_2O_3$ | 31.06 | 31.66 | 31.52 | 31.45 | 31.08 |
| $Yb_2O_3$ | | | | | |
| $Lu_2O_3$ | | | | | |
| $TiO_2$ | | | | | |
| $ZrO_2$ | 7.04 | 7.06 | 7.07 | 7.07 | 7.05 |
| $SnO_2$ | | | | | 0.60 |
| $TeO_2$ | | | | | |
| $Nb_2O_5$ | | 1.98 | 1.32 | 0.99 | |
| $Ta_2O_5$ | 2.25 | | 1.75 | 2.63 | 5.25 |
| $WO_3$ | | | | | |
| $ZnO$ | 1.00 | 1.00 | 1.00 | 1.01 | 1.00 |
| $MgO$ | | | | | |
| $CaO$ | 0.60 | | | | |
| $SrO$ | | | | | |
| $BaO$ | | | | | |
| $Li_2O$ | | | | | |
| $Na_2O$ | | | | | |
| $K_2O$ | | | | | |
| $Cs_2O$ | | | | | |
| $Sb_2O_3$ | 0.04 | 0.05 | 0.05 | 0.05 | 0.05 |
| F | | | | | |
| Total | 100.00 | 100.00 | 100.00 | 100.00 | 100.00 |
| α | 64 | 64 | 63 | 64 | 63 |
| β | 1.36 | 1.29 | 1.32 | 1.26 | 1.37 |
| α × β | 87.04 | 82.56 | 83.16 | 80.64 | 86.31 |
| nd | 1.812 | 1.814 | 1.816 | 1.816 | 1.816 |
| νd | 47.4 | 46.6 | 46.6 | 46.6 | 46.6 |
| $SiO_2/B_2O_3$ | 0.423 | 0.410 | 0.417 | 0.419 | 0.422 |
| $(Ta_2O_5 + Nb_2O_5 + WO_3)/(Gd_2O_3 + Y_2O_3)$ | 0.066 | 0.063 | 0.097 | 0.115 | 0.169 |
| $(ZrO_2 + Ta_2O_5 + Nb_2O_5)/(SiO_2 + B_2O_3)$ | 0.369 | 0.350 | 0.397 | 0.420 | 0.487 |
| $(ZnO + Y_2O_3)/La_2O_3$ | 0.134 | 0.031 | 0.031 | 0.032 | 0.034 |
| $ZrO_2 + Nb_2O_5$ | 7.04 | 9.04 | 8.39 | 8.06 | 7.05 |

TABLE 6

| % by mass | 26 | 27 | 28 | 29 | 30 |
|---|---|---|---|---|---|
| $SiO_2$ | 7.49 | 2.43 | 5.17 | 1.94 | 2.38 |
| $B_2O_3$ | 17.96 | 24.96 | 20.66 | 24.64 | 24.02 |
| $Al_2O_3$ | | | | | |
| $P_2O_5$ | | | | | |
| $Y_2O_3$ | | 1.50 | | | 1.50 |
| $La_2O_3$ | 31.81 | 38.46 | 37.63 | 41.88 | 42.90 |
| $Gd_2O_3$ | 31.05 | 17.57 | 21.31 | 16.34 | 12.26 |
| $Yb_2O_3$ | | | | | |
| $Lu_2O_3$ | | | | | |
| $TiO_2$ | | | | | |
| $ZrO_2$ | 7.04 | 6.63 | 6.80 | 6.50 | 5.57 |
| $SnO_2$ | | | | | |
| $TeO_2$ | | | | 0.100 | |
| $Nb_2O_5$ | 3.00 | 4.98 | 3.63 | 5.55 | 7.40 |
| $Ta_2O_5$ | | 2.92 | 4.24 | | 2.92 |
| $WO_3$ | 0.60 | | | 3.00 | |
| $ZnO$ | 1.00 | 0.50 | 0.51 | | 1.00 |
| $MgO$ | | | | | |
| $CaO$ | | | | | |
| $SrO$ | | | | | |
| $BaO$ | | | | | |
| $Li_2O$ | | | | | |
| $Na_2O$ | | | | | |
| $K_2O$ | | | | | |
| $Cs_2O$ | | | | | |
| $Sb_2O_3$ | 0.05 | 0.05 | 0.05 | 0.05 | 0.05 |
| F | | | | | |
| Total | 100.00 | 100.00 | 100.00 | 100.00 | 100.00 |
| α | 63 | 62 | 63 | 64 | 62 |
| β | 1.34 | 1.36 | 1.29 | 1.34 | 1.31 |
| α × β | 84.42 | 84.32 | 81.27 | 85.76 | 81.22 |
| nd | 1.819 | 1.819 | 1.825 | 1.826 | 1.834 |
| νd | 45.5 | 44.7 | 44.7 | 43.4 | 42.6 |
| $SiO_2/B_2O_3$ | 0.417 | 0.097 | 0.250 | 0.079 | 0.099 |
| $(Ta_2O_5 + Nb_2O_5 + WO_3)/(Gd_2O_3 + Y_2O_3)$ | 0.116 | 0.414 | 0.369 | 0.523 | 0.750 |
| $(ZrO_2 + Ta_2O_5 + Nb_2O_5)/(SiO_2 + B_2O_3)$ | 0.394 | 0.530 | 0.568 | 0.453 | 0.602 |
| $(ZnO + Y_2O_3)/La_2O_3$ | 0.031 | 0.052 | 0.014 | 0.000 | 0.058 |
| $ZrO_2 + Nb_2O_5$ | 10.04 | 11.61 | 10.43 | 12.05 | 12.97 |

TABLE 7

| % by mass | 31 | 32 | 33 | 34 | 35 |
|---|---|---|---|---|---|
| $SiO_2$ | 2.82 | 7.39 | 4.61 | 6.43 | 5.89 |
| $B_2O_3$ | 23.38 | 14.96 | 17.67 | 11.67 | 12.46 |
| $Al_2O_3$ | | | | | |
| $P_2O_5$ | | | | | |
| $Y_2O_3$ | 3.00 | | | 1.33 | |
| $La_2O_3$ | 43.92 | 39.99 | 41.96 | 42.11 | 40.00 |
| $Gd_2O_3$ | 8.17 | 15.38 | 12.08 | 13.54 | 15.38 |
| $Yb_2O_3$ | | | 1.00 | | |
| $Lu_2O_3$ | | | | | |
| $TiO_2$ | | | 0.50 | | 0.30 |

TABLE 7-continued

| % by mass | 31 | 32 | 33 | 34 | 35 |
|---|---|---|---|---|---|
| $ZrO_2$ | 6.54 | 5.99 | 6.27 | 6.00 | 5.99 |
| $SnO_2$ |  | 0.50 |  | 0.33 |  |
| $TeO_2$ |  |  |  |  |  |
| $Nb_2O_5$ | 6.27 | 1.00 | 3.14 | 0.50 | 1.00 |
| $Ta_2O_5$ | 5.85 | 14.69 | 12.27 | 15.82 | 17.38 |
| $WO_3$ |  |  |  |  |  |
| ZnO |  |  |  | 1.90 | 1.00 |
| MgO |  |  |  |  |  |
| CaO |  |  |  |  |  |
| SrO |  |  |  | 0.30 |  |
| BaO |  |  |  |  |  |
| $Li_2O$ |  |  |  |  |  |
| $Na_2O$ |  |  | 0.50 |  |  |
| $K_2O$ |  |  |  |  | 0.50 |
| $Cs_2O$ |  |  |  |  |  |
| $Sb_2O_3$ | 0.05 | 0.10 |  | 0.07 | 0.10 |
| F |  |  |  |  |  |
| Total | 100.00 | 100.00 | 100.00 | 100.00 | 100.00 |
| α | 62 | 62 | 64 | 65 | 67 |
| β | 1.31 | 1.38 | 1.31 | 1.31 | 1.33 |
| α × β | 81.22 | 85.56 | 83.84 | 85.15 | 89.11 |
| nd | 1.835 | 1.847 | 1.859 | 1.878 | 1.881 |
| νd | 42.7 | 42.7 | 41.8 | 41.2 | 40.7 |
| $SiO_2/B_2O_3$ | 0.121 | 0.494 | 0.261 | 0.551 | 0.473 |
| $(Ta_2O_5 + Nb_2O_5 + WO_3)/(Gd_2O_3 + Y_2O_3)$ | 1.085 | 1.020 | 1.276 | 1.098 | 1.195 |
| $(ZrO_2 + Ta_2O_5 + Nb_2O_5)/(SiO_2 + B_2O_3)$ | 0.712 | 0.970 | 0.973 | 1.233 | 1.328 |
| $(ZnO + Y_2O_3)/La_2O_3$ | 0.068 | 0.000 | 0.000 | 0.077 | 0.025 |
| $ZrO_2 + Nb_2O_5$ | 12.81 | 6.99 | 9.41 | 6.50 | 6.99 |

TABLE 8

| % by mass | 36 | 37 | 38 |
|---|---|---|---|
| $SiO_2$ | 6.39 | 5.92 | 6.42 |
| $B_2O_3$ | 11.96 | 12.50 | 11.65 |
| $Al_2O_3$ |  |  |  |
| $P_2O_5$ |  |  |  |
| $Y_2O_3$ |  |  | 1.33 |
| $La_2O_3$ | 39.99 | 40.47 | 42.02 |
| $Gd_2O_3$ | 15.39 | 15.46 | 13.51 |
| $Yb_2O_3$ |  |  |  |
| $Lu_2O_3$ |  |  |  |
| $TiO_2$ |  | 0.25 |  |
| $ZrO_2$ | 5.99 | 6.03 | 5.99 |
| $SnO_2$ | 0.50 |  | 0.50 |
| $TeO_2$ |  |  |  |
| $Nb_2O_5$ | 1.00 | 1.00 | 0.50 |
| $Ta_2O_5$ | 18.68 | 17.62 | 15.59 |
| $WO_3$ |  |  | 2.19 |
| ZnO |  | 0.65 |  |
| MgO |  |  |  |
| CaO |  |  |  |
| SrO |  |  |  |
| BaO |  |  |  |
| $Li_2O$ |  |  |  |
| $Na_2O$ |  |  |  |
| $K_2O$ |  |  |  |
| $Cs_2O$ |  |  |  |
| $Sb_2O_3$ | 0.10 | 0.10 | 0.10 |
| F |  |  |  |
| Total | 100.0 | 100.0 | 100.0 |
| α | 66 | 68 | 67 |
| β | 1.30 | 1.32 | 1.34 |
| α × β | 85.80 | 89.76 | 89.78 |
| nd | 1.883 | 1.883 | 1.883 |
| νd | 40.8 | 40.8 | 40.7 |
| $SiO_2/B_2O_3$ | 0.534 | 0.474 | 0.551 |
| $(Ta_2O_5 + Nb_2O_5 + WO_3)/(Gd_2O_3 + Y_2O_3)$ | 1.279 | 1.204 | 1.245 |
| $(ZrO_2 + Ta_2O_5 + Nb_2O_5)/(SiO_2 + B_2O_3)$ | 1.399 | 1.338 | 1.233 |

TABLE 8-continued

| % by mass | 36 | 37 | 38 |
|---|---|---|---|
| $(ZnO + Y_2O_3)/La_2O_3$ | 0 | 0.016 | 0.032 |
| $ZrO_2 + Nb_2O_5$ | 6.99 | 7.03 | 6.49 |

TABLE 9

| % by mass | Comp. Ex. A | Comp. Ex. B | Comp. Ex. C |
|---|---|---|---|
| $SiO_2$ | 6.70 | 1.00 | 6.00 |
| $B_2O_3$ | 10.80 | 24.00 | 34.50 |
| $Al_2O_3$ |  |  |  |
| $P_2O_5$ |  |  |  |
| $Y_2O_3$ | 3.80 | 2.18 |  |
| $La_2O_3$ | 41.80 | 40.68 | 30.00 |
| $Gd_2O_3$ | 9.60 | 12.68 |  |
| $Yb_2O_3$ |  |  |  |
| $Lu_2O_3$ |  |  |  |
| $TiO_2$ |  |  |  |
| $ZrO_2$ | 5.20 | 6.00 | 5.00 |
| $SnO_2$ |  |  |  |
| $TeO_2$ |  |  |  |
| $Nb_2O_5$ | 1.30 | 7.75 |  |
| $Ta_2O_5$ | 15.90 |  |  |
| $WO_3$ |  |  |  |
| ZnO | 4.50 | 5.75 | 22.00 |
| MgO |  |  |  |
| CaO |  |  | 2.00 |
| SrO |  |  |  |
| BaO |  |  | 0.50 |
| $Li_2O$ | 0.20 |  |  |
| $Na_2O$ |  |  |  |
| $K_2O$ |  |  |  |
| $Cs_2O$ |  |  |  |
| $Sb_2O_3$ | 0.20 |  |  |
| F |  |  |  |
| Total | 100.0 | 100.4 | 100.0 |
| α | 71 | 67 | 51 |
| β | 1.28 | 1.50 | 2.55 |
| α × β | 90.88 | 100.50 | 130.05 |
| nd | 1.88 | 1.834 | 1.783 |
| νd | 40.9 | 42.7 | 47.7 |
| $SiO_2/B_2O_3$ | 0.620 | 0.042 | 0.174 |
| $(Ta_2O_5 + Nb_2O_5 + WO_3)/(Gd_2O_3 + Y_2O_3)$ | 1.284 | 0.522 |  |
| $(ZrO_2 + Ta_2O_5 + Nb_2O_5)/(SiO_2 + B_2O_3)$ | 1.280 | 0.550 | 0.123 |
| $(ZnO + Y_2O_3)/La_2O_3$ | 0.199 | 0.195 | 0.733 |
| $ZrO_2 + Nb_2O_5$ | 6.50 | 13.75 | 5.00 |

All of the glass products in accordance with the invention mentioned in Tables 1 to 8 were prepared in such a manner that common materials for optical glass such as the corresponding oxide, hydroxide, carbonate, nitrate, fluoride, hydroxide, metaphosphate, etc. as the materials for each component were used, weighed and mixed in a predetermined ratio, poured over into a platinum crucible, fused for 3 to 4 hours at the temperature range of 1,200 to 1,400° C. in an electric furnace depending upon the easiness of the fusion of the glass composition, stirred for making uniform, lowered down to an appropriate temperature, placed in a metal mold or the like and gradually cooled.

It has been found that, as shown in Tables 1 to 8, all of the preferred Examples of the invention are able to achieve the desired optical constants and the product α×β. On the contrary, in the Comparative Examples shown in Table 9, Comparative Example 1 is able to achieve a relatively small α×β but, as compared with Examples 36 to 38 where the optical constants are similar, the mass % ratio of $SiO_2/B_2O_3$ exceeds 0.6 whereby an average linear expansion coefficient α becomes big and the product α×β is more than $90 \times 10^{-12°}$ $C.^{-1} \times nm \times cm^{-1} \times Pa^{-1}$. In Comparative Example B, abundant ZnO is contained and, therefore, the optical elasticity constant β becomes large and the product α×β exceeds $100 \times 10^{-12}°$ $C.^{-1} \times nm \times cm^{-1} \times Pa^{-1}$ as compared with Examples 30 to 32 where the optical constants are similar. Besides that, amount of $SiO_2$ is small and the mass % ratio of $SiO_2/B_2O_3$ is less than 0.05 and, therefore, resistance of the glass against devitrification is not sufficient and, when the glass is cast, crystals are generated nearly on the whole surface of the glass. In Comparative Example C, amount of ZnO is significantly large and the mass % ratio of $(ZnO+Y_2O_3)/La_2O_3$ is as big as 0.733 and, therefore, the optical elasticity constant β increases and the product α×β exceeds $130 \times 10^{-12°}$ $C.^{-1} \times nm \times cm^{-1} \times Pa^{-1}$.

When the glass products of the Examples mentioned in Tables 1 to 8 were subjected to a cold processing or a reheat press processing, no problem such as devitrification was resulted but they were able to be stably made into various lens and prism forms.

When the lens or the prism prepared as such was installed in a camera or a projector and an image formation characteristic was confirmed, the image formation characteristic which is expected by an optical design utilizing the optical constants obtained at room temperature was reproducible even upon operations at high temperature (about 50 to 70° C.).

Although the invention was illustrated in detail hereinabove for an object of exemplification, it will be understood that the Examples are merely for an object of exemplification and that various modifications are able to be carried out by persons skilled in the art without deviating from the idea and scope of the invention.

In accordance with the invention, there is provided an optical glass with a high refractive index and a low dispersion having a refractive index (nd) of not less than 1.75 and an Abbe's number (vd) of not less than 35 where the image formation characteristic is hardly affected by changes in temperature of the using environment and, when the optical glass is used, lenses and prisms for image projecting (reproducing) instruments such as projectors and picture-taking devices such as highly precise camera are able to be stably manufactured.

What is claimed is:

1. An optical glass comprising:
   $SiO_2$ in an amount of more than 1.0% by mass and less than 12.0% by mass on the basis of an oxide,
   $B_2O_3$ in an amount of 8.0 to 24.96% by mass,
   the ratio of $SiO_2/B_2O_3$ in terms of % by mass being more than 0 and less than 0.6, and
   $La_2O_3$ in an amount of 25.0 to 50.0% by mass, and
   $Y_2O_3$ in an amount of not more than 5.0% by mass,
   $Yb_2O_3$ in an amount of 0.0 to 1.0% by mass,
   wherein the product of α and β where α is an average linear expansion coefficient within −30° C. to +70° C. and β is an optical elasticity constant at the wavelength of 546.1 nm is not more than $130 \times 10^{-12°}$ $C.^{-1} \times nm \times cm^{-1} \times Pa^{-1}$.

2. The optical glass according to claim 1, wherein the glass has optical constants within the rages where the refractive index (nd) is 1.75 to 2.00 and the Abbe's number (vd) is 35 to 55.

3. The optical glass according to claim 1, wherein the glass contains, on the basis of an oxide, one or more oxides selected from the group consisting of 0.0 to 40.0% by mass of $Gd_2O_3$, 0.0 to 15.0% by mass of $ZrO_2$, 0.0 to 25.0% by mass of $Ta_2O_5$, 0.0 to 18.0% by mass of $Nb_2O_5$ and 0.0 to 10.0% by mass of $WO_3$.

4. The optical glass according to claim 1, wherein the glass contains, on the basis of an oxide, one or more oxides selected from the group consisting of
   0.0 to 0.1% by mass of $GeO_2$,
   0.0 to 1.0% by mass of $Ga_2O_3$, and
   0.0 to 1.0% by mass of $Bi_2O_3$,
   wherein optical glass does not contain a lead compound such as PbO and an arsenic compound such as $As_2O_3$.

5. The optical glass according to claim 1, wherein the product of α and β (where α is an average linear expansion coefficient within −30° C. to +70° C., and β is an optical elasticity constant at the wavelength of 546.1 nm) is not more than $100 \times 10^{-12°}$ $C.^{-1} \times nm \times cm^{-1} \times Pa^{-1}$.

6. The optical glass according to claim 1, wherein the product of α and β (where α is an average linear expansion coefficient within −30° C. to +70° C., and β is an optical elasticity constant at the wavelength of 546.1 nm) is not more than $90 \times 10^{-12°}$ $C.^{-1} \times nm \times cm^{-1} \times Pa^{-1}$.

7. The optical glass according to claim 1, wherein the ratio of $(Ta_2O_5+Nb_2O_5+WO_3)/(Gd_2O_3+Y_2O_3)$ in terms of % by mass based on the oxides is more than 0.05 and less than 1.30.

8. The optical glass according to claim 1, wherein the glass contains one or more oxides selected from the group consisting of
   0 to 5.0% of $Li_2O$,
   0 to 5.0% of $Na_2O$,
   0 to 5.0% of $K_2O$,
   0 to 5.0% of $Cs_2O$,
   0 to 5.0% of MgO,
   0 to 5.0% of CaO,
   0 to 5.0% of SrO,
   0 to 5.0% of BaO,
   0 to 3.0% of $TiO_2$,
   0 to 3.0% of $SnO_2$,
   0 to 3.0% of $Al_2O_3$,
   0 to 5.0% of $P_2O_5$,
   0 to 10.0% of ZnO,
   0 to 5.0% of $Lu_2O_3$,
   0 to 3.0% of $TeO_2$,
   0 to 2.0% of $Sb_2O_3$, and
   0 to 3.0% of F,
   in terms of % by mass on the basis of an oxide.

9. The optical glass according to claim 1, wherein the glass contains less than 2.0% by mass of ZnO on the basis of an oxide.

10. The optical glass according to claim 1, wherein the glass contains less than 3.5% by mass of $Y_2O_3$ on the basis of an oxide.

11. The optical glass according to claim 1, wherein the ratio of $(ZrO_2+Ta_2O_5+Nb_2O_5)/(SiO_2+B_2O_3)$ in terms of % by mass on the basis of an oxide is less than 1.00.

12. The optical glass according to claim 1, wherein the glass contains less than 3.5% by mass of $Y_2O_3$ on the basis of an oxide, the ratio of $(ZnO+Y_2O_3)/La_2O_3$ in terms of % by mass on the basis of an oxide is more than 0 and less than 0.5 and the sum of $ZrO_2+Nb_2O_5$ in terms of % by mass is more than 5.0% and less than 13.0%.

13. An optical glass, comprising:
   more than 1.0% by mass and less than 10.0% by mass of $SiO_2$,
   15.0 to 28.0% by mass of $B_2O_3$,
   28.0 to 35.0% by mass of $La_2O_3$,
   25.0 to 35.0% by mass of $Gd_2O_3$,
   5.0 to 9.0% by mass of $ZrO_2$, and
   0.1 to less than 2.0% by mass of ZnO, and one or more oxides selected from the group consisting of
0.0 to 6.0% by mass of $Ta_2O_5$,
0.0 to 5.0% by mass of $Nb_2O_5$,
0.0 to 1.0% by mass of $Sb_2O_3$, and
0.0 to less than 1.0% by mass of $Al_2O_3$, on the basis of an oxide, wherein the glass contains 0.0 to 1.0% by mass of $Yb_2O_3$, the sum of $ZrO_2+Nb_2O_5$ is more than 5.0% by mass to less than 13.0% by mass, the glass has optical constants within such ranges that the refractive index (nd) is 1.78 to 1.83 and the Abbe's number (vd) is 44 to 48, and the product of α and β where α is an average linear expansion coefficient within −30° C. to +70° C., and β is an optical elasticity constant at the wavelength of 546.1 nm is not more than $90 \times 10^{-12}$ °C.$^{-1}$×nm×cm$^{-1}$×Pa$^{-1}$.

14. An optical element comprising the glass according to claim 1.

15. An optical element comprising the glass according to claim 1, wherein the optical element is prepared by a reheat press processing.

16. An optical instrument using an optical element and optical substrate material comprising the glass according to claim 1.

17. The optical glass according to claim 1, wherein the glass contains 0.0 to 0.5% by mass of $Yb_2O_3$ on the basis of an oxide.

18. The optical glass according to claim 13, wherein the glass contains 0.0 to 0.5% by mass of $Yb_2O_3$ on the basis of an oxide.

* * * * *